United States Patent
Yasukawa et al.

(10) Patent No.: US 10,212,737 B2
(45) Date of Patent: Feb. 19, 2019

(54) RADIO COMMUNICATION TERMINAL, RADIO BASE STATION AND RADIO COMMUNICATION METHOD

(71) Applicant: NTT DOCOMO, INC., Tokyo (JP)

(72) Inventors: Shimpei Yasukawa, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/025,018

(22) PCT Filed: Sep. 16, 2014

(86) PCT No.: PCT/JP2014/074414
§ 371 (c)(1),
(2) Date: Mar. 25, 2016

(87) PCT Pub. No.: WO2015/045959
PCT Pub. Date: Apr. 2, 2015

(65) Prior Publication Data
US 2016/0234865 A1    Aug. 11, 2016

(30) Foreign Application Priority Data
Sep. 26, 2013    (JP) .................................. 2013-199187

(51) Int. Cl.
*H04W 74/08* (2009.01)
*H04W 28/24* (2009.01)
(Continued)

(52) U.S. Cl.
CPC ......... *H04W 74/0833* (2013.01); *H04W 4/70* (2018.02); *H04W 16/00* (2013.01);
(Continued)

(58) Field of Classification Search
CPC ........... H04W 74/0833; H04W 76/046; H04W 72/044; H04W 4/005; H04W 28/24;
(Continued)

(56) References Cited

U.S. PATENT DOCUMENTS

2009/0305693 A1    12/2009 Shimomura et al.
2011/0287776 A1*   11/2011 Vujcic ................. H04W 72/048
                                                455/452.1

(Continued)

FOREIGN PATENT DOCUMENTS

JP    WO 2013084347 A1 *  6/2013
WO       2013084347 A1    6/2013

OTHER PUBLICATIONS

Intel Corporation, Discussion on PRACH Coverage Enhancement for Low Cost MTC, 3GPP TSG RAN WG1 Meeting #74, Barcelona, Spain, Aug. 29-23, 2013, R1-132930.*

(Continued)

*Primary Examiner* — Shailendra Kumar
(74) *Attorney, Agent, or Firm* — Osha Liang LLP

(57) ABSTRACT

The present invention is designed so that PRACH transmission is carried out taking coverage enhancement into account. A radio communication terminal employs coverage enhancement and has a transmitting section that transmits a random access preamble by using a radio resource that is stipulated for the radio communication terminal employing coverage enhancement, and, in this radio communication terminal, one or a combination of the time, the frequency band and the sequence of the radio resource that is stipulated for the radio communication terminal employing coverage enhancement is different from that of a radio resource that is stipulated for a radio communication terminal not employing coverage enhancement.

5 Claims, 13 Drawing Sheets

(51) Int. Cl.
*H04W 76/00* (2018.01)
*H04W 4/00* (2018.01)
*H04W 72/04* (2009.01)
*H04W 4/70* (2018.01)
*H04W 76/27* (2018.01)
*H04W 16/00* (2009.01)
*H04W 24/02* (2009.01)

(52) U.S. Cl.
CPC ......... *H04W 28/24* (2013.01); *H04W 72/044* (2013.01); *H04W 74/08* (2013.01); *H04W 76/27* (2018.02); *H04W 24/02* (2013.01); *H04W 72/046* (2013.01)

(58) Field of Classification Search
CPC ..... H04W 16/00; H04W 74/08; H04W 24/02; H04W 72/046
See application file for complete search history.

(56) References Cited

U.S. PATENT DOCUMENTS

| | | | |
|---|---|---|---|
| 2012/0033613 A1 | 2/2012 | Lin et al. | |
| 2012/0077507 A1* | 3/2012 | Lee | H04W 74/006 455/450 |
| 2012/0165058 A1* | 6/2012 | Hwang | H04W 74/006 455/509 |
| 2014/0286264 A1* | 9/2014 | Hirata | H04W 48/18 370/329 |
| 2016/0088660 A1* | 3/2016 | Liu | H04L 5/00 370/252 |
| 2017/0105127 A1* | 4/2017 | Xiong | H04W 16/26 |

OTHER PUBLICATIONS

Huawei, HiSilicon, Further discussion on PRACH coverage improvement for Low-Cost MTC UEs, 3GPP TSG RAN WG1 Meeting #74, Barcelona, Spain, Aug. 19-23, 2013, R1-132881.*
Extended European Search Report issued in the counterpart European Patent Application No. 14847097.4, dated Feb. 1, 2017 (10 pages).
International Search Report issued in PCT/JP2014/074414 dated Dec. 2, 2014 (1 page).
Written Opinion of the International Searching Authority issued in PCT/JP2014/074414 dated Dec. 2, 2014 (4 pages).
3GPP TS 36.300 V11.4.0; "3rd Generation Partnership Project; Technical Specification Group Radio Access Network; Evolved Universal Terrestrial Radio Access (E-UTRA); Evolved Universal Terrestrial Radio Access Network (E-UTRAN); Overall Description; Stage 2; (Release 11)"; Dec. 2012 (208 pages).
Intel Corporation; R1-132930; 3GPP TSG RAN WG1 Meeting #74; Agenda item 7.2.4.2; "Discussion on PRACH Coverage Enhancement for Low Cost MTC"; Barcelona Spain, Aug. 19-23, 2013 (7pages).
Office Action issued in the counterpart Japanese Patent Application No. 2013-199187, dated Sep. 5, 2017 (9 pages).
Huawei, et al.; "Further discussion on PRACH coverage improvement for Low-Cost MTC UEs"; 3GPP TSG RAN WG1 Meeting #74, R1-132881, Barcelona, Spain, Aug. 19-23, 2013 (4 pages).
Office Action issued in the counterpart Chilean Patent Application No. 683-2016, dated Jun. 29, 2017 (9 pages).
Office Action issued in the counterpart Japanese Patent Application No. 2013-199187, dated Feb. 6, 2018 (6 pages).
Alcatel-Lucent, et al.; "Coverage enhancement for PRACH"; 3GPP TSG-RAN WG1 Meeting #74, R1-132971; Barcelona, Spain, Aug. 19-23, 2013 (3 pages).

* cited by examiner

CONTENTION-BASED

NON-CONTENTION-BASED

RADIO COMMUNICATION TERMINAL, RADIO BASE STATION AND RADIO COMMUNICATION METHOD

TECHNICAL FIELD

The present invention relates to a radio communication terminal, a radio base station and a radio communication method in a next-generation mobile communication system.

BACKGROUND ART

In a UMTS (Universal Mobile Telecommunications System) network, the specifications of long term evolution (LTE) have been drafted for the purpose of further increasing high speed data rates, providing lower delay and so on (see non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Successor systems of LTE are under study for the purpose of achieving further broadbandization and increased speed beyond LTE. These successor systems of LTE may be referred to as, for example, "LTE-advanced" or "LTE enhancement" (hereinafter referred to as "LTE-A"). In recent years, in the LTE-A system, the demand for communication terminals (MTC: Machine-Type Communication terminals) for small-sized modules, which do not involve operation by people, has been increasing. MTC terminals may be used in, for example, electric meters, gas meters, vending machines, vehicles, and other industrial equipment.

CITATION LIST

Non-Patent Literature

Non-Patent Literature 1: 3GPP TS 36.300 "Evolved UTRA and Evolved UTRAN Overall Description"

SUMMARY OF INVENTION

Technical Problem

MTC terminals may also be used in places where the propagation loss is very significant, such as indoor control boxes. For the LTE-A system, a study is in progress to enhance the coverage of MTC terminals in order to facilitate the use of MTC terminals in indoor environments.

Not all MTC terminals require coverage enhancement, but only part of MTC terminals such as, for example, terminals that are in an indoor environment and suffer severe propagation loss require coverage enhancement. Also, even with those MTC terminals that require coverage enhancement, the maximum level of improvement that is actually needed varies depending on how cells are deployed, what MTC services are presumed and so on.

So, a study is in progress to apply multi-level coverage enhancement to the PRACH that is used upon initial access.

The present invention has been made in view of the above, and it is therefore an object of the present invention to provide a radio communication terminal, a radio base station and a radio communication method that can carry out PRACH transmission taking coverage enhancement into account.

Solution to Problem

The radio communication terminal of the present invention provides a radio communication terminal to employ coverage enhancement and have a transmitting section that transmits a random access preamble by using a radio resource that is stipulated for the radio communication terminal employing coverage enhancement, and, in this radio communication terminal, one or a combination of the time, the frequency band and the sequence of the radio resource that is stipulated for the radio communication terminal employing coverage enhancement is different from that of a radio resource that is stipulated for a radio communication terminal not employing coverage enhancement.

Advantageous Effects of Invention

According to the present invention, it is possible to carry out PRACH transmission taking coverage enhancement into account.

DESCRIPTION OF EMBODIMENTS

Now, an embodiment of the present invention will be described below in detail with reference to the accompanying drawings. Although application of coverage enhancement is not limited to MTC terminals, with the present embodiment, for ease of description, terminals to be subject to coverage enhancement will be referred to as "MTC terminals" or "MTC UEs," and other terminals will be referred to as "legacy UEs." Unless distinction is specifically drawn between MTC terminals and legacy UEs, these may be collectively referred to as "radio communication terminals UE."

Random access (RA) is executed when a radio communication terminal UE establishes connection or re-synchronizes with a radio base station eNodeB (eNB) upon transmission, handover, and so on. When carrying out random access control such as making initial connection, the radio communication terminal UE first transmits an RA preamble (preamble). The channel for first transmitting an RA preamble in random access is referred to as the "physical random access channel (PRACH)."

Figure 1A:
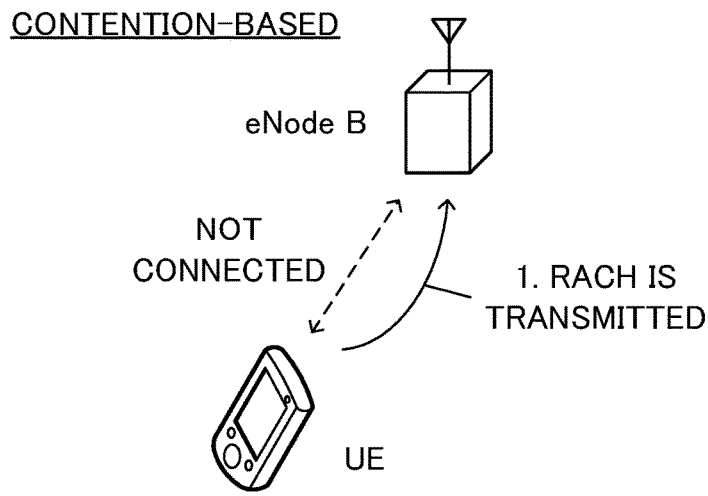
FIG. 1A is a diagram to explain contention-based random access.

As shown in FIG. 1, random access can be classified into two types, namely the contention-based and the non-contention-based. In the contention-based shown in FIG. 1A, the radio communication terminal UE transmits a preamble, selected randomly from a plurality of RA preambles (contention preambles) prepared within the cell, by means of the PRACH. In this case, if the same RA preamble is used between radio communication terminals UE, there is a possibility that a collision occurs.

Figure 1B:
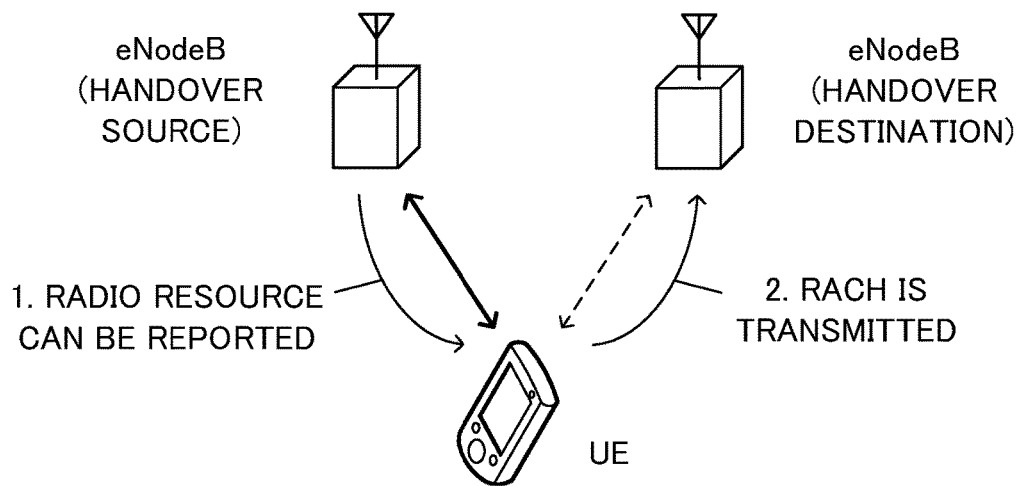
FIG. 1B is a diagram to explain non-contention-based random access.

In the non-contention-based shown in FIG. 1B, the radio communication terminal UE transmits a UE-specific RA preamble (dedicated preamble), which is assigned from the network in advance, by means of the PRACH. In this case, different RA preambles are assigned between radio communication terminals UE, so that a collision does not occur.

Figure 2:
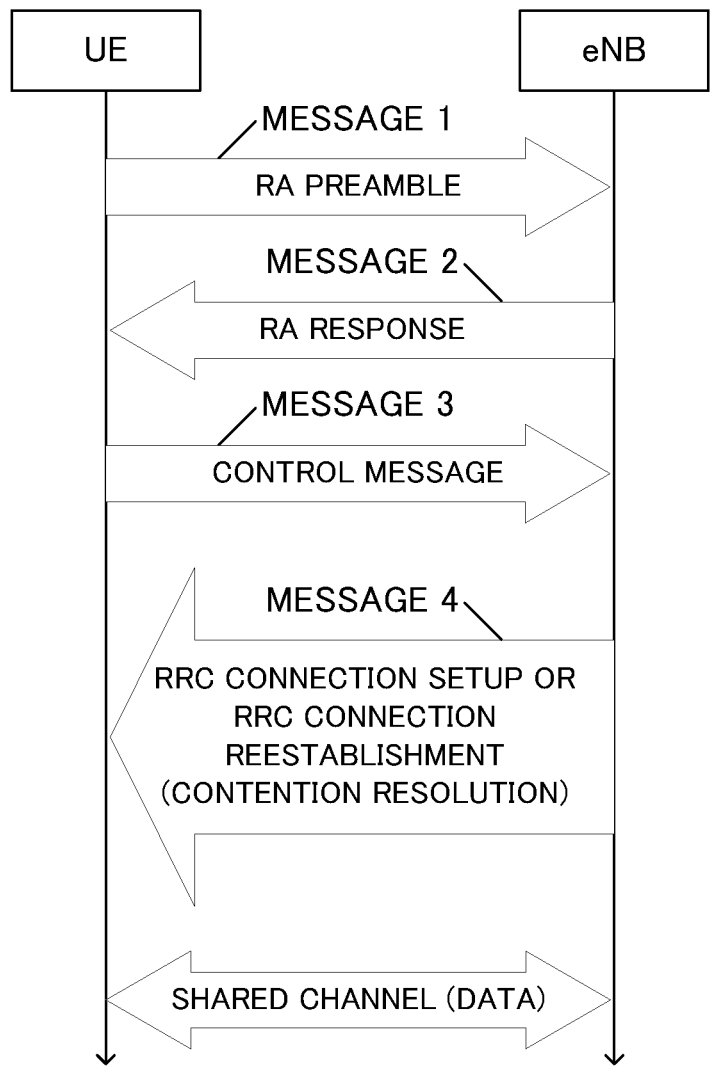
FIG. 2 is a diagram to explain contention-based random access procedures.

With the present invention, contention-based random access will be the subject of discussion. FIG. 2 shows a summary of contention-based random access. A radio communication terminal UE transmits a preamble, which is selected randomly from RA preambles prepared within the cell, as a message 1, in the PRACH. A radio base station eNB, upon detecting the RA preamble, transmits an RA response, which is information in response to that, as a message 2. The radio communication terminal UE, receiving the RA response, transmits a connection request signal (RRC (Radio Resource Control) connection request) as a message 3. After receiving the message 3, the radio base station eNB transmits a connection setup signal (RRC connection setup), which includes cell setup information for establishing connection and so on, as a message 4.

If the UE ID of the subject terminal is included in the message 4, the radio communication terminal UE completes the random access process and establishes connection. On the other hand, if the UE-ID of the subject terminal is not included, the radio communication terminal UE judges that random access has failed, and performs the process again from the transmission of an RA preamble.

The present inventors have arrived at a PRACH transmission method which takes coverage enhancement into account by improving messages 1 and 2 in such random access procedures. To be more specific, the present inventors have arrived at reporting coverage-related information to the radio base station eNB implicitly, by limiting the radio resource (PRACH location) for transmitting the PRACH with respect to message 1. Also, the present inventors have arrived at simplifying the signal detection process in the radio communication terminal UE by limiting the timings to transmit RA responses with respect to message 2.

For coverage enhancement by means of the PRACH, four types of techniques are under study, namely (1) repetition, (2) new signal, (3) frequency hopping and (4) relaxed requirement.

(1) "Repetition" refers to the technique of improving the detection rate by repeating transmitting RA preambles.

(2) "New signal" refers to the technique of using long sequences for preambles, reducing the cyclic prefixes (CPs) and so on. To reduce the CPs, for example, presuming repetition, in a signal to be transmitted in repetition, the first symbol alone may be made a CP.

(3) "Frequency hopping" refers to the technique of achieving frequency diversity gain by making the resource blocks (RBs) to transmit hop.

(4) "Relaxed requirement" refers to the technique of judging that coverage has enhanced, by relaxing the requirement of the detection rate. That is, this "relaxed requirement" technique relies on the retransmission of RA preambles.

Among the four types of techniques that are studied for coverage enhancement by means of the PRACH, the techniques other than repetition cannot anticipate a significant effect of coverage enhancement. Consequently, these techniques may be combined with repetition and employed.

When repetition is applied so that a maximal coverage is secured, the increase of overhead, collisions with the PRACHs of other radio communication terminals UE, the increase of power consumption in the radio communication terminal UE and so on become concerns. Consequently, it is effective to reduce overhead by stipulating the number of repetitions which the radio communication terminal UE applies to the PRACH on multiple levels. Also, it is preferable if collisions with the PRACHs of other radio communication terminals UE can be detected.

The radio base station eNB needs to try detection with all the RA preambles which the radio communication terminal UE may transmit. Consequently, there is a threat that coverage enhancement may result in increasing the complexity of detection in the radio base station eNB. This is because the RA preamble is the signal to be transmitted first from the radio communication terminal UE to the radio base station eNB upon initial access, and the radio base station eNB is unable to know, precisely, which radio communication terminal UE transmits which signal. In particular, if a plurality of numbers of repetitions are allowed, there is a possibility that the number of repetitions transmitted from the radio communication terminal UE and the number of repetitions detected in the radio base station eNB do not match.

Similarly, with RA responses, too, there is a threat that the complexity of detection in the radio communication terminal UE increases, since the randomness of receiving timings increases and also the impact of the number of repetitions increases. Also, given the possibility that repeated signals may not stay within the RA response receiving period (receiving window), it becomes necessary to change the definition of the receiving period (receiving window).

By reporting the coverage of the radio communication terminal UE with the number of repetitions and resource of RA preambles, the setup of coverage enhancement parameters for later signals such as, for example, RA responses is made efficient. The parameters to set up in this case include, for example, the number of repetitions. However, when information about the radio communication terminal UE is short, adequate RA responses cannot be transmitted.

In order to reduce the cost of MTC terminals, a study is in progress to reduce the number of receiving antennas in a terminal UE to one antenna. The number of repetitions of RA preambles is determined based on uplink (UL) coverage. Consequently, when the coverage of the terminal UE is reported with the number of repetitions, an uncertainty for the number of receiving antennas in the terminal UE is produced in the estimation of downlink (DL) coverage.

Consequently, it is preferable if the terminal UE reports the number of receiving antennas in the subject terminal to the radio base station eNB.

Also, a study is in progress to reduce the cost by limiting the band of the downlink data channel of the terminal UE on a baseband level. RA responses that follow RA preambles are transmitted via a downlink shared data channel (PDSCH: Physical Downlink Shared Channel), so that it is preferable to report information about the downlink band limitation to the radio base station eNB. This is because, unless information about the downlink band limitation is reported, the downlink band limitation needs to be applied until information about the terminal UE is acquired.

The radio communication terminal UE may report one or the combination of coverage-related information and UE category or UE capability-related information to the radio base station eNB by transmitting RA preambles. These pieces of information which the radio communication terminal UE may report to the radio base station eNB will be hereinafter also referred to as the "information set."

The coverage-related information in the information set includes, for example, information about DL coverage and UL coverage. The information about DL coverage includes information about the number of UE receiving antennas when one receiving antenna is introduced. The information about UL coverage includes information about the number of PRACH repetitions.

The UE category or UE capability-related information in the information set includes information about the UE category, information regarding the tolerance for delay and information as to whether or not there is downlink band limitation. The tolerance for delay means whether or not coverage enhancement is possible.

By learning these pieces of information, the radio base station eNB can estimate an RA response transmission method (including coverage enhancement) which can meet receipt in the radio communication terminal UE.

Figure 3:
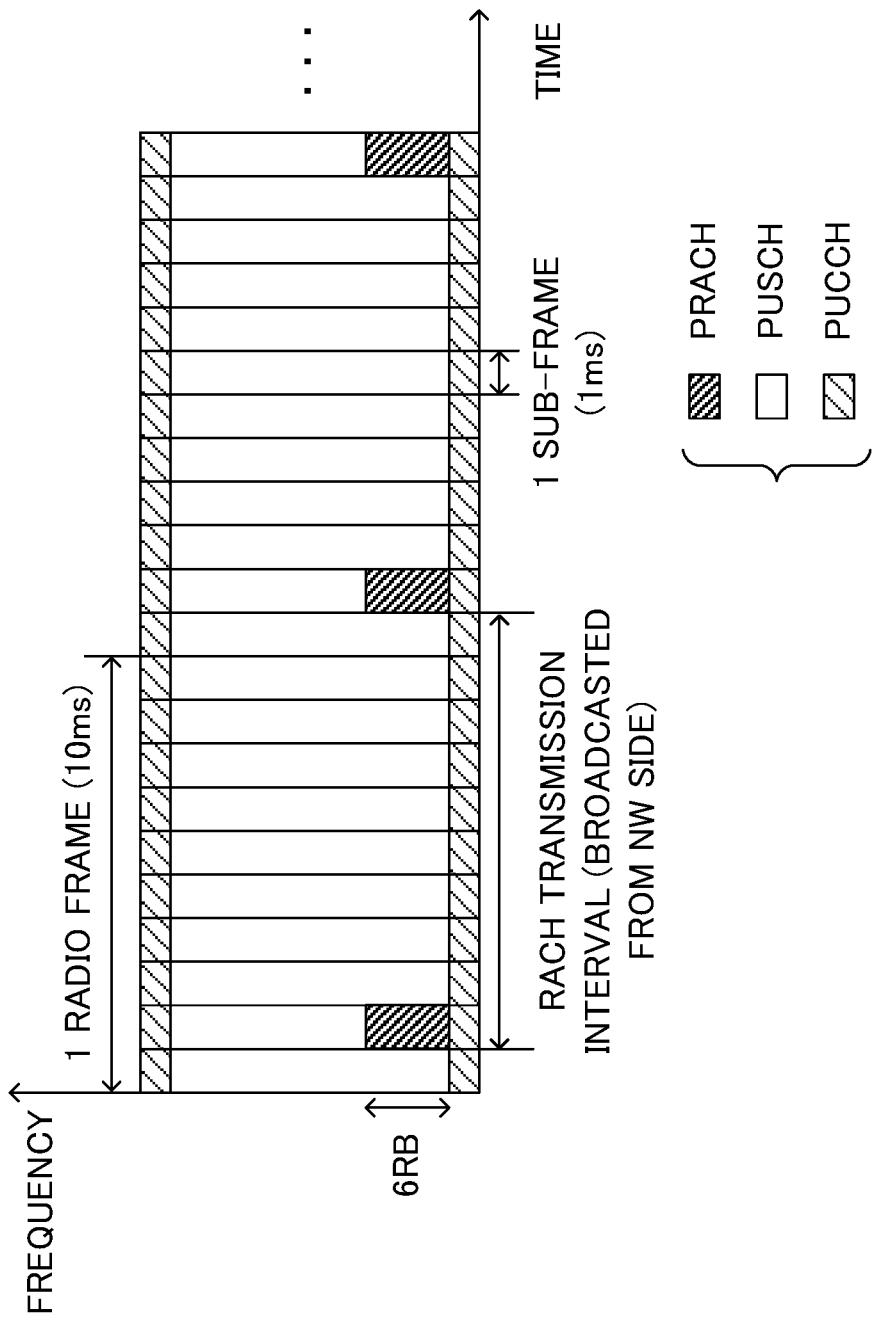
FIG. 3 is a diagram to show RA preamble structures.

FIG. 3 shows the structure of RA preambles. As shown in FIG. 3, the PRACH is allocated to RA preambles as uplink channel radio resource.

The PRACH uses six RBs of bandwidth. Information related to the PRACH is reported as broadcast information (SIB: System Information Block) or as an RRC message. The location of the PRACH resource in the frequency direction is designated by a PRACH frequency offset. In the event of TDD, the location of the PRACH resource in the frequency direction can be transmitted in multiple patterns (maximum six patterns) of six RBs, depending on the combination of the UL/DL configuration and the PRACH configuration. The location of the PRACH resource in the time direction is designated by a PRACH configuration index.

An RA preamble is transmitted in a subframe designated by a PRACH configuration index.

First Example

A case will be described here with a first example where the resource for transmitting the PRACH in response to message 1 in random access procedures is limited.

For an MTC terminal, a PRACH transmission resource (PRACH location) that is different from that of a legacy UE is designated by one or the combination of time, the frequency band and the sequence. By this means, the complexity of receipt in a radio base station eNB is reduced, and implicit reporting of the information set is made possible.

(1-1) Approach on the Time Axis

The timing to start transmitting the PRACH is limited with respect to an MTC terminal, so as to lighten the PRACH detection process in the radio base station eNB. Both or one of the system frame indices and the subframe indices may be used to indicate PRACH transmission start timings. Alternatively, the timings to start PRACH transmission may be provided at intervals equal to or greater than the system frame index (10 or more).

FIG. 4 provides diagram to explain example cases where the timing to start PRACH transmission is limited with respect to an MTC terminal. In FIG. 4, the RA preambles of the legacy UE and the MTC terminal are the same RBs.

In FIG. 4, the broken lines in the vertical direction indicate the timings to start transmitting RA preambles, configured by PRACH configuration indices and so on. In FIG. 4, the arrows in the horizontal direction each indicate the number of times to repeat the RA preamble, and differences between the arrows in length indicate that the number of repetitions varies. Multiple arrows indicate that multiple candidates for the number of repetitions are stipulated. In FIG. 4, the arrows of solid lines indicate that the number of repetitions is selected from multiple candidates.

Figure 4A:
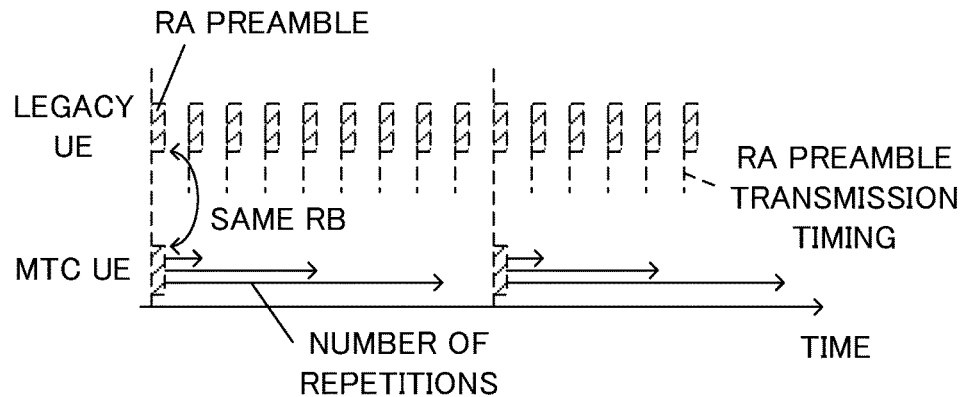
FIG. 4 provides diagrams to explain example cases where, in a first example, the timings to start transmitting the PRACH are limited with respect to an MTC terminal.

For example, as shown in FIG. 4A, timings to start transmitting RA preambles can be stipulated for the MTC terminal.

Figure 4B:
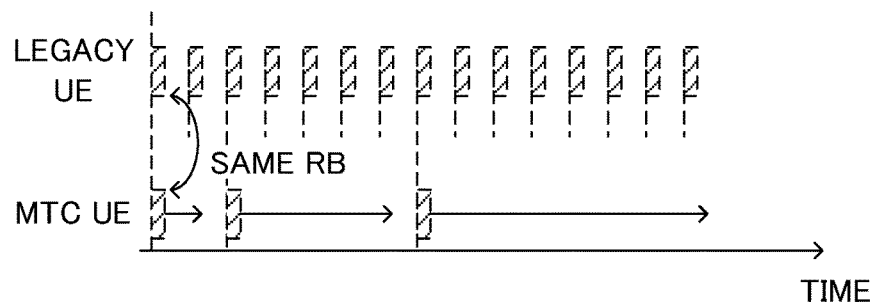

It is also possible, as shown in FIG. 4B, to stipulate the timings to start transmitting RA preambles for the MTC terminal, and, furthermore, set up different transmission start timings according to the number of RA preamble repetitions.

Figure 4C:
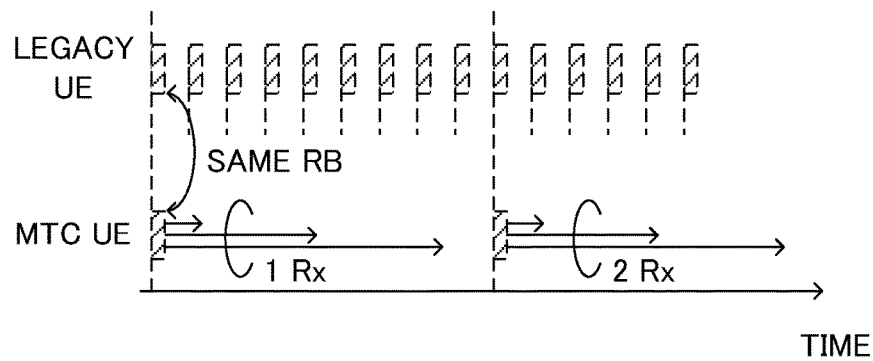

It is also possible, as shown in FIG. 4C, to configure the timings to start transmitting RA preambles for the MTC terminal, and, furthermore, set up different transmission start timings according to the number of receiving antennas in the MTC terminal.

As shown in FIG. 4, it is possible to report part of the information set, implicitly, by stipulating the timing to start PRACH transmission for the MTC terminal. For example, in the example shown in FIG. 4B, the number of times to repeat RA preambles can be reported implicitly. In the example shown in FIG. 4C, the number of receiving antennas in the MTC terminal can be reported implicitly.

The timing to start PRACH transmission is stipulated by one or the combination of the method of linking with PRACH configuration indices, the method of reporting by means of MIB (Management Information Base)/SIB, the method of linking with RSRP (Reference Signal Received Power), and the method of linking with UE categories/capabilities.

(1-2) Approach on the Frequency Axis

RA preambles, to which coverage enhancement is applied, are transmitted using a different frequency from that of existing RA preambles. The PRACH in this case may be transmitted using a fixed resource, or may be transmitted using a hopping pattern that is stipulated in advance or that is reported in broadcast information.

FIG. 5 provides diagrams to explain example cases where the timing and frequency to start transmitting the PRACH are limited with respect to the MTC terminal. In FIG. 5, the RA preambles for the legacy UE and the MTC terminal are separate RBs.

In FIG. 5, the broken lines in the vertical direction indicate the timings to start transmitting RA preambles, stipulated by PRACH configuration indices and so on. In FIG. 5, the arrows in the horizontal direction each indicate the number of times to repeat the RA preamble, and differences between the arrows in length indicate that the number of repetitions varies. Multiple arrows indicate that multiple candidates for the number of repetitions are stipulated. In FIG. 5, the arrows of solid lines indicate that the number of repetitions is selected from multiple candidates.

Figure 5A:
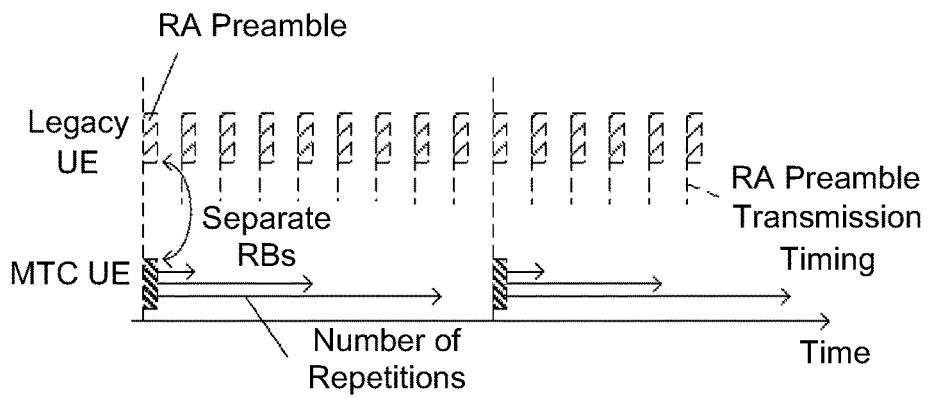
FIG. 5 provides diagrams to explain example cases where, in the first example, the timings and frequencies to start transmitting the PRACH are limited with respect to an MTC terminal.

For example, as shown in FIG. 5A, the timing and frequency to start transmitting RA preambles can be stipulated for the MTC terminal.

Figure 5B:
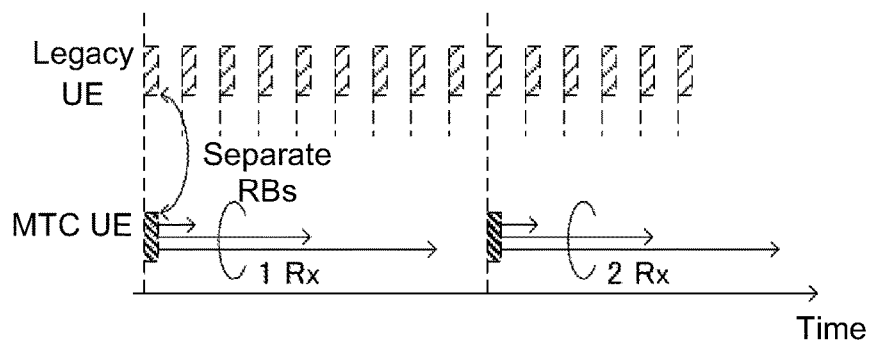

It is also possible, as shown in FIG. 5B, to stipulate the timing and frequency to start transmitting RA preambles for the MTC terminal, and, furthermore, set up different transmission start timings according to the number of receiving antennas in the MTC terminal.

Figure 5C:
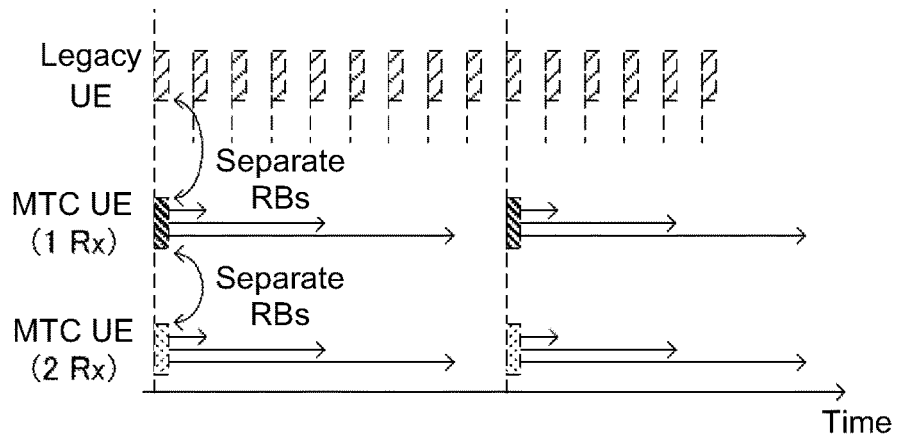

It is also possible, as shown in FIG. 5C, to stipulate the timing and frequency to start transmitting RA preambles for the MTC terminal, and, furthermore, set up different frequencies according to the number of receiving antennas in the MTC terminal.

As shown in FIG. 5, it is possible to report part of the information set, implicitly, by stipulating the timing and frequency to start PRACH transmission for the MTC terminal. For example, in the examples shown in FIGS. 5B and 5C, the number of receiving antennas in the MTC terminal can be reported implicitly.

The frequency of the PRACH transmission resource is provided by one or the combination of the method of linking with PRACH configuration indices, the method of reporting by means of MIB (Management Information Base)/SIB, the method of linking with RSRP (Reference Signal Received Power), and the method of linking with UE categories/capabilities.

The PUSCH may be transmitted with the PRACH resource for the MTC terminal, or may be transmitted using a resource for dedicated use for the PRACH.

(1-3) Approach Based on Sequence

Figure 6:
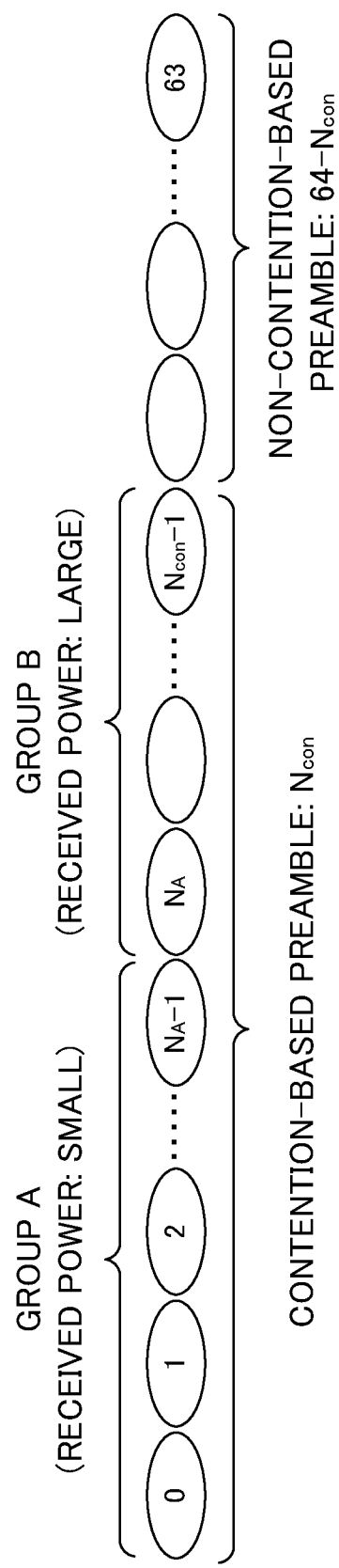
FIG. 6 is a diagram to show preamble sequences.

When transmitting RA preambles, each cell can use 64 preamble sequences. As shown in FIG. 6, preamble sequences are divided into contention-based preambles and non-contention-based preambles. The contention-based preambles are further divided into two groups (two subsets). A radio communication terminal to try contention-based random access randomly selects one from the sequences included in these two subsets.

RA preamble sequences may be allocated for the MTC terminal. Assume that the allocation of the sequences is reported in broadcast information or set up in advance. It is also possible to further divide the sequences allocated to the MTC terminal and report part of the information set implicitly.

The sequences of group A (or group B) shown in FIG. 6 may be provided for dedicated use by the MTC terminal. That is, it is possible to allocate one of the subsets defined in the random access preamble sequences for dedicated use by the MTC terminal. In this case, the group that is provided for dedicated use by the MTC terminal is not selected for the legacy UE.

For the MTC terminal, sequences that overlap between existing groups A and B may be allocated.

Following this, the RA preamble receiving operation and the RA response transmitting operation by the radio base station eNB will be described.

The radio base station eNB tries receipt in all possible repetition patterns. Consequently, depending on the method of limiting the transmission timing and band, there is a possibility that a plurality of numbers of repetitions are detected for the same RA preamble. For example, when {10, 20, 50} are stipulated as numbers of repetitions that may be used, cases might occur where the MTC terminal carries out transmission in the number of repetitions {50}, and the radio base station eNB can carry out detection in the numbers of repetitions {20, 50}.

If a plurality of numbers of repetitions are detected in the radio base station eNB, the shortest or the longest number of repetitions may be used to determine later coverage enhancement parameters (also referred to as "coverage improvement parameters"). The determined parameters can be reported using an RA response.

The MTC terminal may transmit RA preambles by applying the number of repetitions that is limited in advance based on RSRP and so on. Also, the MTC terminal may try receiving an RA response in parallel with RA preamble transmission, and transmit RA preambles until receiving an RA response or until reaching the maximum number of repetitions.

The radio base station eNB can determine the parameters of coverage enhancement to apply to the RA response—for example, the number of repetitions—by using part or all of the information set reported from the MTC terminal. How to determine the parameters by using part or all of the information set may be defined in advance. By this means, the MTC terminal becomes capable of estimating the coverage enhancement parameters to be applied to RA responses.

In the contention-based random access procedures shown in FIG. 2, the radio base station eNB transmits an RA response to the radio communication terminal UE as message 2. By means of the RA response, the radio base station eNB reports four pieces of information to the radio communication terminal UE—namely, (1) the index of the RA preamble received, (2) the TC-RNTI (Temporary Cell-Radio Network Temporary Identifier), (3) a TA (Timing Advance) command, and (4) a UL scheduling grant for allowing the radio communication terminal UE to transmit message 3.

The radio base station eNB transmits the above four pieces of information in the PDSCH that is included in a MAC PDU (Protocol Data Unit).

HARQ (Hybrid Automatic Repeat Request) is not used for the transmission of the RA response. This is because cases might occur where, even when the radio communication terminal UE receives an RA response that is not for the subject terminal, an ACK nevertheless cannot be transmitted with proper timing, and may interfere with uplink control signals from other radio communication terminals UE.

The radio communication terminal UE monitors the PDCCH (Physical Downlink Control Channel) from the radio base station eNB, and masks its CRC (Cyclic Redundant Check) portion with the subject terminal's RNTIs. The masking may be, for example, the exclusive-or operation (XOR). The radio terminal apparatus UE may carry out CRC check using the RNTIs of the subject terminal, and, if the result is good, recognizes that the resource information is for the subject terminal.

In contention-based random access procedures, the following RNTIs appear.

(1) RA-RNTI (Random Access-RNTI)

The RA-RNTI is determined by the subframe index where the RA preamble is transmitted. The radio communication terminal UE masks the PDCCH of message 2 with the RA-RNTI.

(2) TC-RNTI (Temporary Cell-RNTI)

The TC-RNTI is reported from the radio base station eNB to the radio communication terminal UE in message 2. The radio communication terminal UE masks the PDCCH of message 4 with the TC-RNTI.

(3) C-RNTI (Cell-RNTI)

When the random access procedures succeed, the TC-RNTI is made the C-RNTI as is. The radio communication terminal UE masks the PDCCH in data transmission/receipt after the random access procedures, with the C-RNTI.

Figure 7:
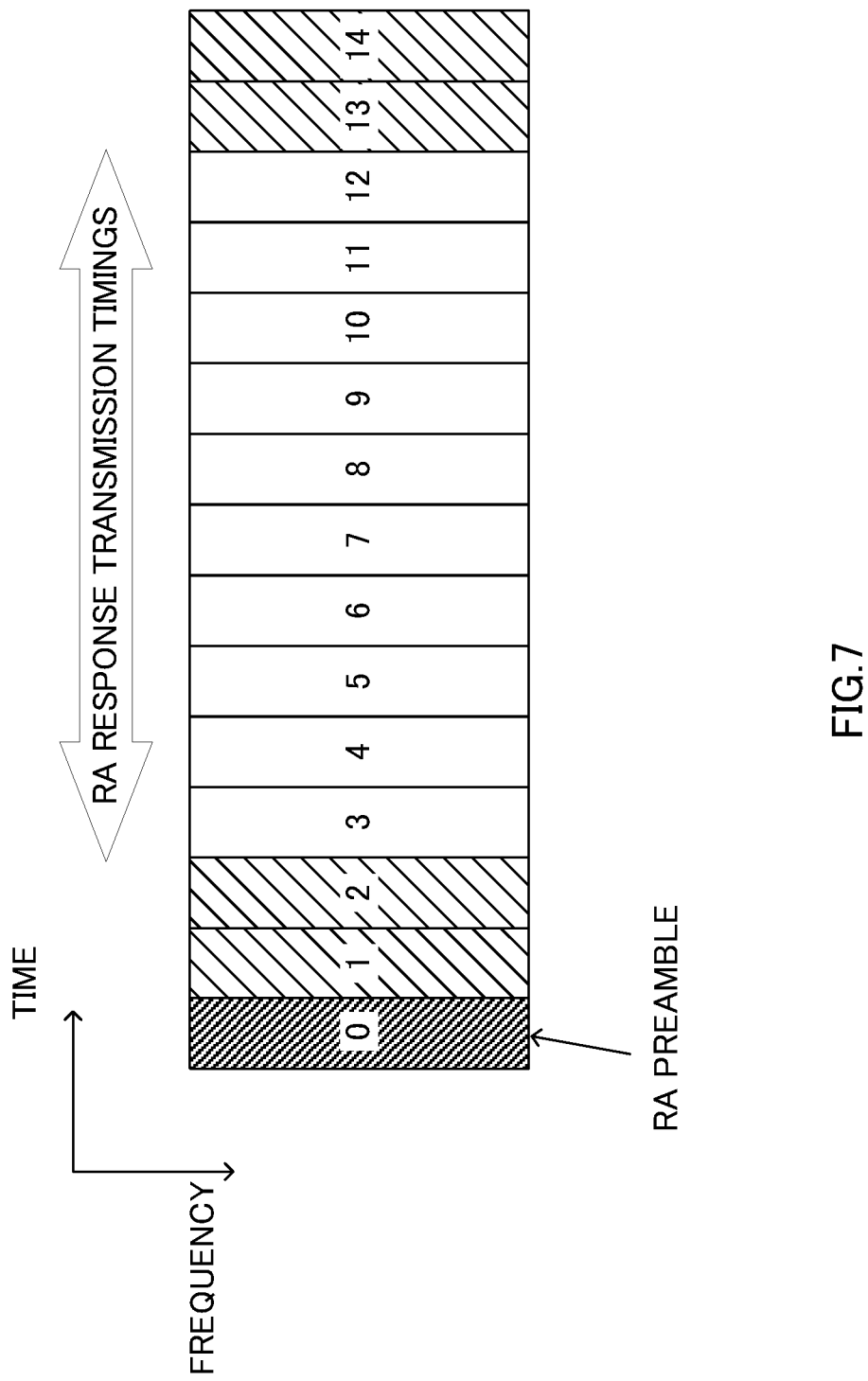
FIG. 7 is a diagram to show timings to transmit RA responses.

FIG. 7 is a diagram to explain the timings to transmit RA responses. The radio base station eNB having received an RA preamble transmits an RA response in a stipulated transmission period (transmission window)—that is, in the period of {3 to 12} shown in FIG. 7.

Second Example

A case will be described here with a second example where the timing to transmit an RA response to message 1 in random access procedures is limited.

FIG. 8 provides diagrams to explain example cases where, in the second example, the timings to transmit RA responses are limited with respect to an MTC terminal. In FIG. 8, after an RA preamble is transmitted from the MTC terminal, an RA response is transmitted from the radio base station eNB.

In FIG. 8, the broken lines in the vertical directions indicate RA response transmission timings. In FIG. 4, the arrows in the horizontal direction each indicate the number of times to repeat the RA preamble or RA response, and differences between the arrows in length indicate that the number of repetitions varies. Multiple arrows indicate that multiple candidates for the number of repetitions are stipulated. In FIG. 8, the arrows of solid lines indicate that the number of repetitions is selected from multiple candidates.

Figure 8A:
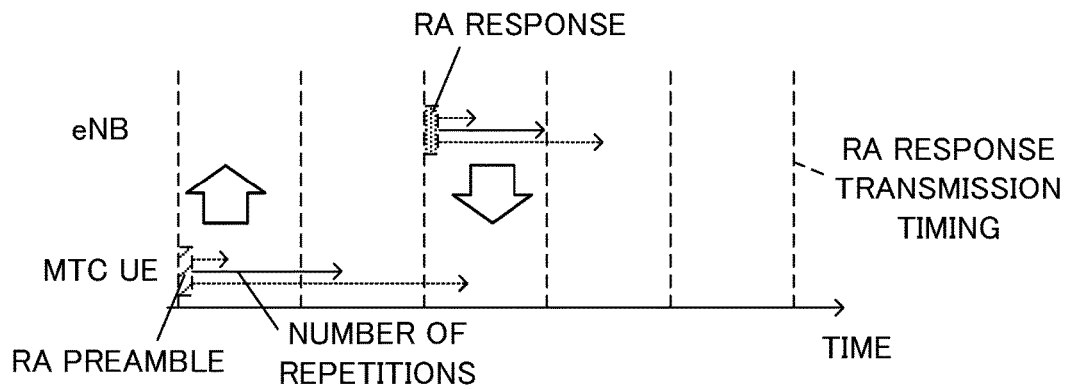
FIG. 8 provides diagrams to explain example cases where, in a second example, the timings to transmit RA responses are limited with respect to an MTC terminal.

In FIG. 8A, as shown with the six vertical broken lines, the timings to transmit RA responses are stipulated in advance. These transmission timings are predetermined timings within the time window shown in FIG. 7. The radio base station eNB, after detecting an RA preamble, does not transmit immediately transmit an RA response within the time window shown in FIG. 7, but, instead, transmits an RA response at the closest timing among the timings that are determined in advance.

The MTC terminal has to carry out the RA response detection process only at RA response transmission timings that are determined in advance. Consequently, the signal detection process in the MTC terminal can be simplified.

Figure 8B:
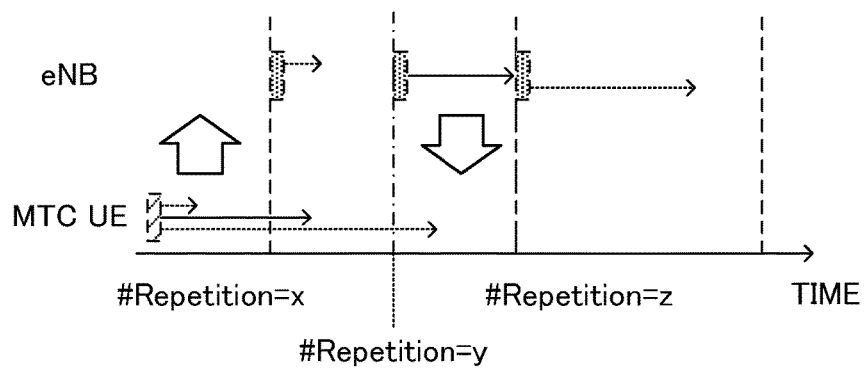

As shown in FIG. 8B, RA response transmission timings may be stipulated according to the number of RA response repetitions. In FIG. 8B, different RA response transmission timings are stipulated between cases where the number of RA response repetitions is x, y and z.

As shown in FIG. 8B, RA response transmission timings may be stipulated in multiple patterns, or may be stipulated in one pattern.

The RA-RNTI may be reflective of one or the combination of whether or not coverage enhancement is applied, the number of RA preamble repetitions detected in the radio base station eNB and the radio resource in which the PRACH is transmitted.

For example, when the RA-RNTI is reflective of information about the number of repetitions of RA preambles, the RA-RNTI can be determined from following equation 1:

$$RA\text{-}RNTI = 1 + t\_id + 10 \times f\_id + 60 \times r\_id \quad \text{(Equation 1)}$$

In equation 1, r_id is the ID of the number of repetitions. Note that r_id=0 holds with non-MTC UEs.

For example, when information about the resource to transmit the PRACH is reflected in the RA-RNTI, the RA-RNTI can be determined by following equation 2:

$$RA\text{-}RNTI = 1 + t\_id + 10 \times f\_id + 60 \times f\_id2 \quad \text{(Equation 2)}$$

In equation 2, f_id2 is the radio resource to transmit the PRACH when coverage enhancement is applied—that is, the location of the RBs for the MTC terminal. Note that f_id2=0 holds with non-MTC UEs.

Figure 8C:
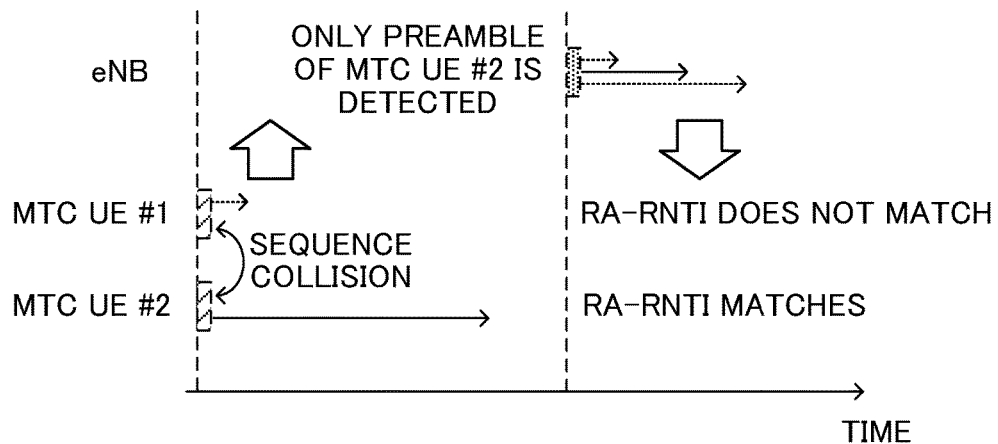

As shown in FIG. 8C, it is possible to stipulate RA response transmission timings for the MTC terminal, and, furthermore, reflect the number of RA preamble repetitions detected by the radio base station eNB in the RA-RNTI.

In the example shown in FIG. 8C, a collision of RA preamble sequences occurs between MTC terminal #1 and MTC terminal #2. The radio base station eNB has detected only the RA preamble transmitted from the MTC terminal #2. In this case, the radio base station eNB transmits an RA response at an RA response transmission timing stipulated for the MTC terminals. Furthermore, the RA-RNTI is reflective of the number of RA preamble repetitions for MTC terminal #2, detected by the radio base station eNB.

MTC terminals #1 and #2 each detect the RA response. In this case, the RA-RNTI does not match in MTC terminal #1, and therefore MTC terminal #1 judges that this RA response is not a response to the subject terminal. The RA-RNTI matches in MTC terminal #2, so that MTC terminal #2 judges that this RA response is a response to the subject terminal.

In the example shown in FIG. 8C, the rate the MTC terminals can detect RA response collisions improves. In other words, the rate the MTC terminals can detect RA responses for the subject terminals improves.

Information about one or the combination of whether or not coverage enhancement is applied, the number of RA preamble repetitions detected by the radio base station eNB and the radio resource in which the PRACH is transmitted may be reported by using an RA response, through RRC signaling.

The timings to transmit RA responses stipulated for the MTC terminal may be the same as the timings to transmit the PDCCH and the PDSCH, or may be different timings. The timings to transmit RA responses stipulated for the MTC terminal may be reported in broadcast information. Also, parts that assume common operations between the PDCCH and the PDSCH follow the PDCCH and the PDSCH.

(Structure of Radio Communication System)

Now, a structure of a radio communication system according to the present embodiment will be described below. In this radio communication system, the radio communication methods according to the above first example and second example are employed.

Figure 9:
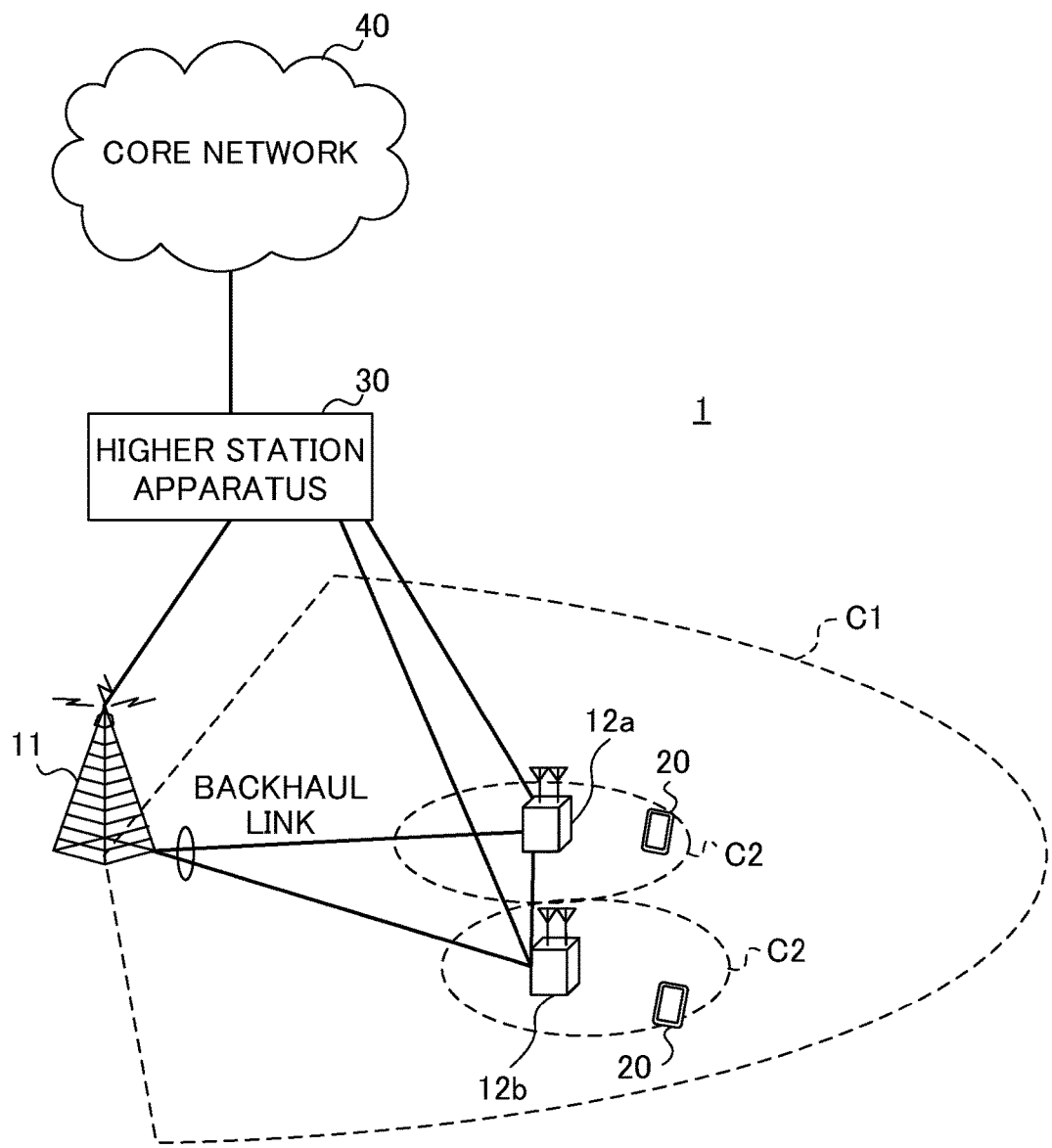
FIG. 9 is a schematic diagram to show an example of a radio communication system according to the present embodiment.

FIG. 9 is a schematic structure diagram to show an example of a radio communication system according to the present embodiment. As shown in FIG. 9, the radio communication system 1 includes a macro base station 11, which forms a macro cell C1, and small base stations 12a and 12b, which are placed in the macro cell C1 and which form small cells C2 that are narrower than the macro cell C1. In FIG. 9, the user terminals 20, which are radio communication terminals, are structured to be capable of having radio communication with at least one of the macro base station 11 and the small base stations 12a and 12b (hereinafter collectively referred to as "small base stations 12"). Note that the number of macro base stations 11 and small base stations 12 is by no means limited to the number illustrated in FIG. 9.

In the macro cell C1 and the small cells C2, the same frequency band may be used, or different frequency bands may be used. Also, the macro base station 11 and each small base station 12 are connected with each other via an inter-base station interface (for example, optical fiber, X2 interface, etc.). The macro base station 11 and the small base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these.

Note that the macro base station 11 is a radio base station having a relatively wide coverage, and may be referred to as an "eNodeB (eNB)," a "radio base station," a "transmission point" and so on. The small base stations 12 are radio base stations that have local coverages, and may be referred to as "RRHs (Remote Radio Heads)," "pico base stations," "femto base stations," "HeNBs (Home eNodeBs)," "transmission points," "eNodeBs (eNBs)" and so on. The user terminals 20 are terminals to support various communication schemes such as LTE and LTE-A, and may not only be mobile communication terminals, but may also be stationary communication terminals as well.

The radio communication system 1 presumes cases where the networks that are formed per macro cell are asynchronous (asynchronous operation). Also, in the radio communication system 1, as radio access schemes, OFDMA (Orthogonal Frequency Division Multiple Access) is applied to the downlink, and SC-FDMA (Single-Carrier Frequency Division Multiple Access) is applied to the uplink.

In the radio communication system 1, a downlink shared channel (PDSCH: Physical Downlink Shared Channel), which is used by each user terminal 20 on a shared basis, a downlink control channel (PDCCH: Physical Downlink Control Channel), an EPDCCH (Enhanced Physical Downlink Control Channel), a PCFICH (Physical Control Format Indicator Channel), a PHICH (Physical Hybrid-ARQ Indicator Channel), a broadcast channel (PBCH: Physical Broadcast Channel) and so on are used as downlink communication channels. User data and higher layer control information are transmitted by the PUSCH. Downlink control information (DCI) is transmitted by the PDCCH and the EPDCCH.

Also, in the radio communication system 1, as uplink communication channels, an uplink shared channel (PUSCH: Physical Uplink Shared Channel) that is used by each user terminal 20 on a shared basis, an uplink control channel (PUCCH: Physical Uplink Control Channel) and so on are used. User data and higher layer control information are transmitted by the PUSCH. Also, by means of the PUCCH, downlink radio quality information (CQI: Channel Quality Indicator), delivery acknowledgement information (ACK/NACK) and so on are transmitted.

Hereinafter, the macro base station 11 and the small base stations 12 will be collectively referred to as "radio base station 10," unless distinction needs to be drawn otherwise.

Figure 10:
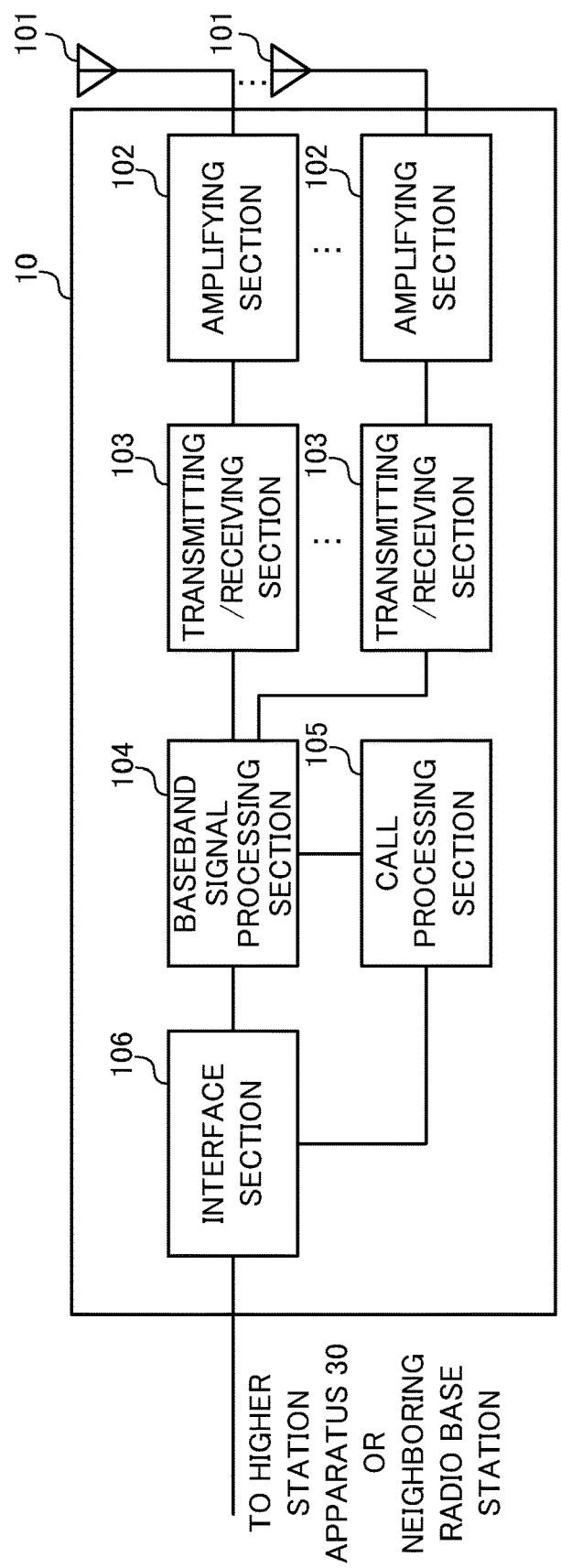
FIG. 10 is a diagram to explain an overall structure of a radio base station according to the present embodiment.

FIG. 10 is a diagram to show an overall structure of a radio base station 10 according to the present embodiment. The radio base station 10 has a plurality of transmitting/receiving antennas 101 for MIMO transmission, amplifying sections 102, transmitting/receiving sections 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is forwarded to each transmitting/receiving section 103. Furthermore, downlink control signals are also subjected to transmission processes such as channel coding and an inverse fast Fourier transform, and are forwarded to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for uplink signals, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input uplink signals is subjected to an FFT process, an IDFT process, error correction decoding, a MAC retransmission control receiving process, and RLC layer and PDCP layer receiving processes, and forwarded to the higher station apparatus 30 via the interface section 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, X2 interface, etc.). Alternatively, the interface section 106 transmits and receives signals to and from the higher station apparatus 30 via a predetermined interface.

Figure 11:
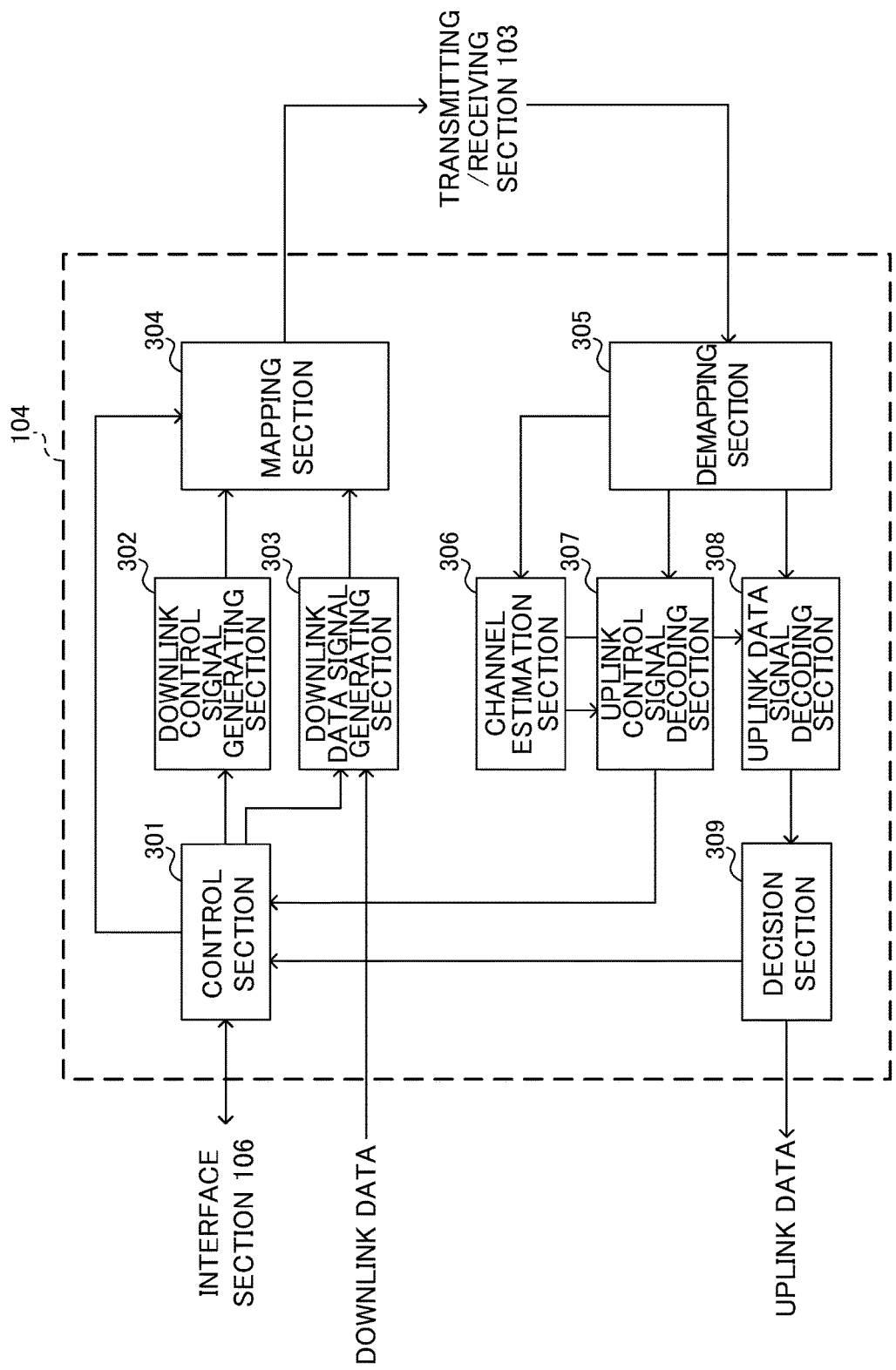
FIG. 11 is a diagram to explain a functional structure of a radio base station according to the present embodiment.

FIG. 11 is a diagram to show a principle functional structure of a baseband signal processing section 104 provided in a radio base station 10 according to the present embodiment. As shown in FIG. 11, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a decision section 309.

The control section 301 controls the scheduling of downlink user data that is transmitted in the PDSCH, downlink control information that is transmitted in one or both of the PDCCH and the enhanced PDCCH (EPDCCH), downlink reference signals and so on. Also, the control section 301 controls the scheduling of RA preambles that are transmitted in the PRACH, uplink data that is transmitted in the PUSCH, uplink control information that is transmitted in the PUCCH or the PUSCH, uplink reference signals and so on (allocation control). Information about the allocation control of uplink signals (uplink control signals, uplink user data) is reported to the user terminals 20 by using a downlink control signal (DCI).

The control section 301 controls the allocation of radio resources to downlink signals and uplink signals based on command information from the higher station apparatus 30, feedback information from each user terminal 20, and so on. That is, the control section 301 functions as a scheduler.

The control section 301 detects the information set of a user terminals 20 to apply coverage enhancement to—that is, an MTC terminal—based on the resource in which the PRACH is transmitted. The control section 301 determines the coverage enhancement parameters to apply to an RA response by using part of or all of the information set reported from the user terminal 20. The control section 301 determines the timing to transmit the RA response.

The downlink control signal generating section 302 generates downlink control signals (both or either one of the PDCCH signal and the enhanced PDCCH signal) determined to be allocated by the control section 301. To be more specific, the downlink control signal generating section 302 generates a DL assignment, which reports downlink signal allocation information, and an uplink grant, which reports uplink signal allocation information.

The downlink data signal generating section 303 generates downlink data signals (PDSCH signals) determined to be allocated to resources by the control section 301. The data signals that are generated in the data signal generating section 303 are subjected to a coding process and a modulation process, based on coding rates and modulation schemes that are determined based on CSI from each user terminal 20 and so on.

The mapping section 304 controls the allocation of the downlink control signals generated in the downlink control signal generating section 302 and the downlink data signals generated in the downlink data signal generating section 303 to radio resources, based on commands from the control section 301.

The demapping section 305 demaps uplink signals transmitted from the user terminals and separates the uplink signals. The channel estimation section 306 estimates channel states from the reference signals included in the received signals separated in the demapping section 305, and outputs the estimated channel states to the uplink control signal decoding section 307 and the uplink data signal decoding section 308.

The uplink control signal decoding section 307 decodes feedback signals (delivery acknowledgement signals and so on) transmitted from the user terminals in uplink control channels (PRACH, PUCCH), and outputs the results to the control section 301. The uplink data signal decoding section 308 decodes the uplink data signals transmitted from the user terminals in the uplink shared channel (PUSCH), and outputs the results to the decision section 309. The decision section 309 makes retransmission control decisions (ACK/NACK decisions) based on the decoding results in the uplink data signal decoding section 308, and also outputs the results to the control section 301.

Figure 12:
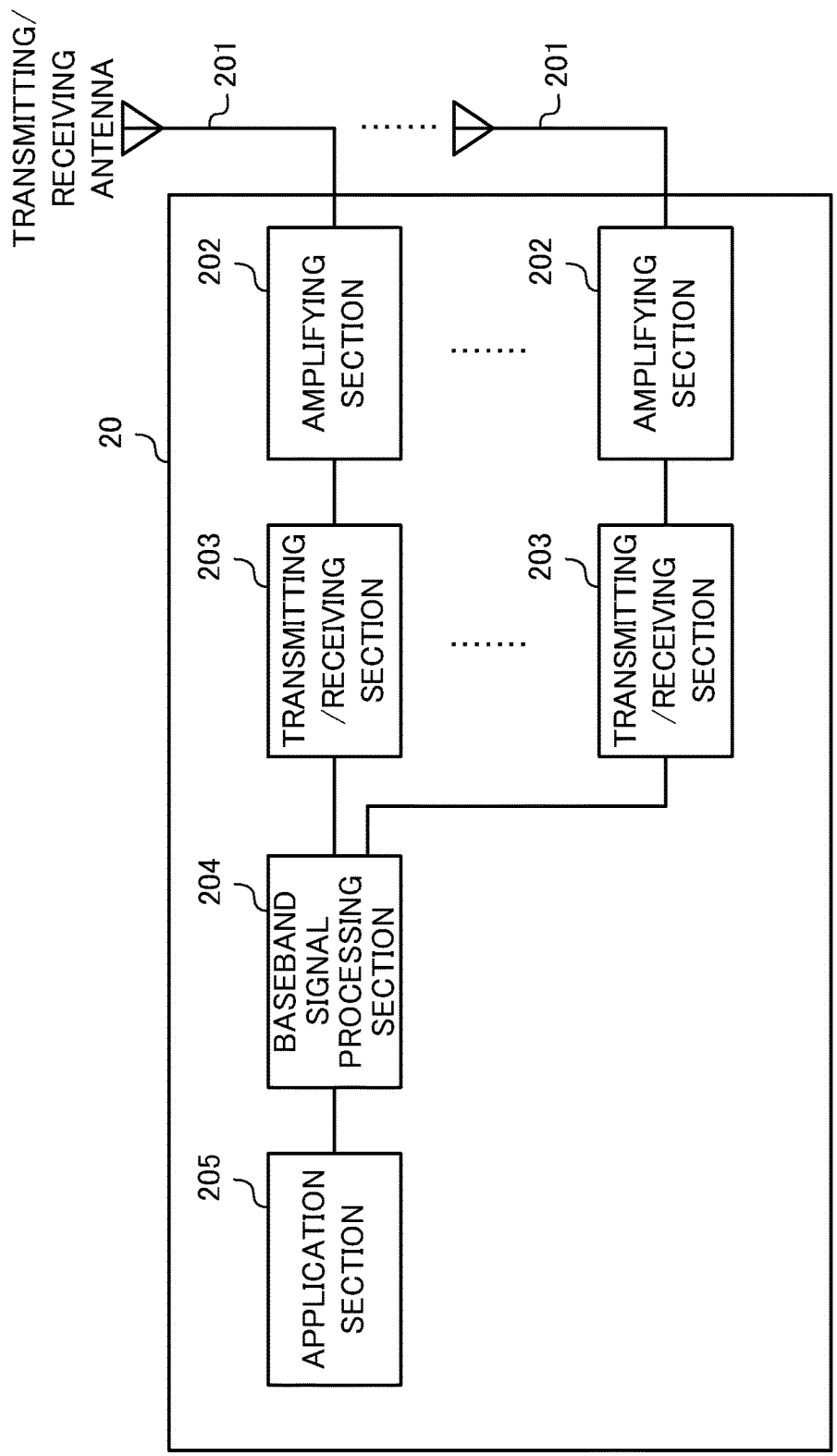
FIG. 12 is a diagram to explain an overall structure of a radio communication terminal according to the present embodiment.

FIG. 12 is a diagram to show an overall structure of a user terminal 20 according to the present embodiment—that is, an MTC terminal or a legacy UE. As shown in FIG. 12, the user terminal 20 has a plurality of transmitting/receiving antennas 201 for MIMO transmission, amplifying sections 202, transmitting/receiving sections (receiving sections) 203, a baseband signal processing section 204 and an application section 205. Although FIG. 12 shows a plurality of transmitting/receiving antennas 201, the number of transmitting/receiving antennas 201 to provide in the user terminal 20 may be one as well.

As for downlink data, radio frequency signals that are received in a plurality of transmitting/receiving antennas 201 are each amplified in the amplifying sections 202, and subjected to frequency conversion and converted into baseband signals in the transmitting/receiving section 203. These baseband signals are subjected to an FFT process, error correction decoding, a retransmission control receiving process and so on, in the baseband signal processing section 204. In this downlink data, downlink user data is forwarded to the application section 205. The application section 205 performs processes related to higher layers above the physical layer and the MAC layer, and so on. Also, in the downlink data, broadcast information is also forwarded to the application section 205.

Meanwhile, uplink user data is input from the application section 205 into the baseband signal processing section 204. The baseband signal processing section 204 performs a retransmission control (H-ARQ (Hybrid ARQ)) transmission process, channel coding, pre-coding, a DFT process, an IFFT process and so on, and the result is forwarded to each transmitting/receiving section 203. Baseband signals that are output from the baseband signal processing section 204 are converted into a radio frequency band in the transmitting/receiving sections 203. After that, the amplifying sections 202 amplify the radio frequency signals having been subjected to frequency conversion, and transmit the result from the transmitting/receiving antennas 201.

Figure 13:
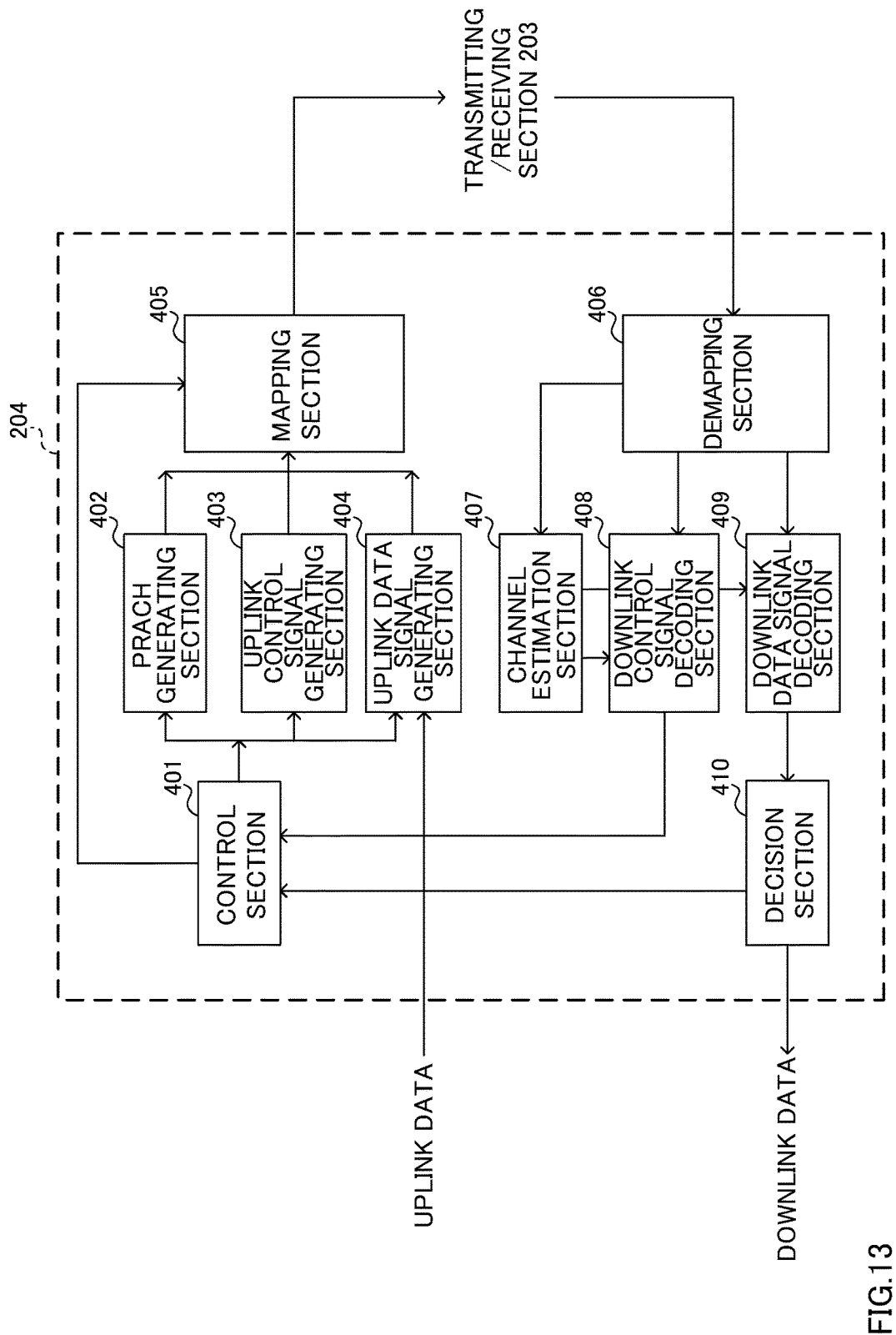
FIG. 13 is a diagram to explain a functional structure of a radio communication terminal according to the present embodiment.

FIG. 13 is a diagram to show a principle functional structure of the baseband signal processing section 204 provided in the user terminal 20. As shown in FIG. 13, the baseband signal processing section 204 provided in the user terminal 20, is comprised at least of a control section 401, a PRACH generating section 402, an uplink control signal generating section 403, an uplink data signal generating section 404, a mapping section 405, a demapping section 406, a channel estimation section 407, a downlink control signal decoding section 408, a downlink data signal decoding section 409 and a decision section 410.

The control section 401 controls the generation of uplink control signals, (A/N signals and so on), uplink data signals and so on based on downlink control signals (PDCCH signals) transmitted from the radio base station, retransmission control decision results in response to the PDSCH signals received, and so on. The downlink control signals received from the radio base station are output from the downlink control signal decoding section 408, and the retransmission control decision results are output from the decision section 410.

Based on a preamble selected from the RA preamble sequences and the information set to be reported to the radio base station 10, the control section 401 controls the radio resource to transmit the RA preamble.

The PRACH generating section 402 generates the PRACH based on commands from the control section 401. The uplink control signal generating section 403 generates uplink control signals (feedback signals such as delivery acknowledgement signals, channel state information (CSI) and so on) based on commands from the control section 401. The uplink data signal generating section 404 generates uplink data signals based on commands from the control section 401. Note that, when a UL grant in included in a downlink control signal reported from the radio base station, the control section 401 commands the uplink data signal generating section 404 to generate an uplink data signal.

The mapping section 405 controls the allocation of the PRACH, uplink control signals (delivery acknowledgement signals and so on) and uplink data signals to radio resources (PUCCH and PUSCH), based on commands from the control section 401.

The demapping section 406 demaps the downlink signals transmitted from the radio base station 10 and separates the downlink signals. The channel estimation section 407 estimates channel states from the reference signals included in the received signals separated in the demapping section 406, and outputs the estimated channel states to the downlink control signal decoding section 408 and the downlink data signal decoding section 409.

The downlink control signal decoding section 408 decodes the downlink control signal (PDCCH signal) transmitted in the downlink control channel (PDCCH), and outputs the scheduling information (information about the allocation to uplink resources) to the control section 401. Also, when information about the cells where delivery acknowledgement signals are fed back, and/or information as to whether or not RF tuning is applied is included in the downlink control signal, these pieces of information are also output to the control section 401.

The downlink data signal decoding section 409 decodes the downlink data signal transmitted in the downlink shared channel (PDSCH), and outputs the result to the decision section 410. The decision section 410 makes a retransmission control decision (A/N decision) based on the decoding result in the downlink data signal decoding section 409, and outputs the result to the control section 401.

Note that the present invention is by no means limited to the above-described embodiment and can be implemented with various changes. The above-described embodiment is not limited to the sizes and shapes illustrated in the accompanying drawings, and changes may be made, as appropriate, within the scope of optimizing the advantages of the present invention. Besides, the present invention can be implemented with various changes, without departing from the scope of the present invention.

The disclosure of Japanese Patent Application No. 2013-199187, filed on Sep. 26, 2013, including the specification, drawings and abstract, is incorporated herein by reference in its entirety.

The invention claimed is:

1. A user terminal that employs coverage enhancement, the user terminal comprising:
a transmitting section that transmits a random access preamble;
a receiving section that receives a random access response; and
a control section that controls transmitting the random access preamble using a random access preamble resource that is different from a random access preamble resource used by a user terminal not employing coverage enhancement,
wherein the random access preamble resource is provided by higher layer signaling,
wherein the receiving section receives the random access response at a timing predetermined for the coverage enhancement, and
wherein the predetermined timing is within a predetermined window.

2. The user terminal according to claim 1, wherein the random access preamble resource is at least one of a subframe index, a frequency, and a number of repetitions defined for the user terminal employing the coverage enhancement.

3. The user terminal according to claim 1, wherein the random access preamble resource is determined based on RSRP (Reference Signal Received Power).

4. The user terminal according to claim 2, wherein the random access preamble resource is determined based on RSRP (Reference Signal Received Power).

5. A radio communication method for a user terminal that communicates with a radio base station employing coverage enhancement, the radio communication method comprising:
transmitting a random access preamble;
receiving a random access preamble; and
controlling transmitting the random access preamble using a random access preamble resource that is different from a random access preamble resource used by a user terminal not employing coverage enhancement,
wherein the random access preamble resource is provided by higher layer signaling,
wherein the receiving section receives the random access response at a timing predetermined for the coverage enhancement, and
wherein the predetermined timing is within a predetermined window.

* * * * *